United States Patent
Bellino

Patent Number: 6,155,173
Date of Patent: Dec. 5, 2000

[54] MODEL ROCKET MOTOR RETAINER

[76] Inventor: Michael F. Bellino, 1 Camelot Dr., Buzzards Bay, Mass. 02532

[21] Appl. No.: 09/231,749

[22] Filed: Jan. 15, 1999

[51] Int. Cl.$^7$ ..................................................... F42B 4/06
[52] U.S. Cl. ........................ 102/349; 102/342; 102/347; 102/361; 102/287
[58] Field of Search .................................. 102/347, 348, 102/349, 361, 287, 342

[56] References Cited

U.S. PATENT DOCUMENTS

| | | | |
|---|---|---|---|
| 2,597,703 | 5/1952 | Busacker | 102/348 X |
| 3,291,047 | 12/1966 | Kitajima et al. | 102/348 X |
| 5,212,946 | 5/1993 | Hans | 60/253 |
| 5,267,885 | 12/1993 | Niskern | 446/88 |
| 5,567,907 | 10/1996 | Westfall | 102/349 X |
| 5,979,329 | 11/1999 | Collar | 102/361 |

*Primary Examiner*—Peter A. Nelson

[57] ABSTRACT

A retainer for model rocket motors having a flange (10) with a concavity (18). Several supports (12) extend perpendicular from the flange (10) and extend to the rocket frame (20). Mounts (14), parallel to the flange (10), abut each of the supports (12). Each mount (14) contains a longitudinal through-hole (16) as a means for attachment to the rocket frame (20).

1 Claim, 2 Drawing Sheets

MODEL ROCKET MOTOR RETAINER

BACKGROUND—FIELD OF INVENTION

This invention relates generally to model rockets, specifically to such devices used for retaining the rocket motor within the rocket frame.

BACKGROUND—DESCRIPTION OF PRIOR ART

One of the many challenges in the recreational hobby of Model Rocketry is the ability to retain the motor(s) during the recovery deployment phase of flight. Sometime after the boost phase of a model rocket flight the typical rocket relies on an ejection charge, firing in the forward direction, to deploy the recovery system thus insuring a soft landing. Most model rocket motor manufactures, such as Estes Industries (Penrose, Colo.) and Aerotech (Las Vegas, Nev.) build such ejection charges into their motors.

In the event the motor is not adequately retained in the rocket frame during the firing of the ejection charge, two undesirable actions would occur. First, the recovery system may not deploy due to lack of inner cavity pressure thus causing the rocket to crash dangerously to the earth. Second, motor casings might be ejected in the aft direction and possibly lost. Lost motor casings are an undesirable occurrence because re-loadable motor casings, such as those sold by Aerotech (Las Vegas, Nev.), are expensive. Furthermore unrecovered plastic single-use motors, such as those sold by North Coast Rocketry (Penrose, Colo.), would constitute environmental pollution. Clearly, for hobby safety and environmental reasons, adequate motor retention is a necessity.

Used in traditional model rockets is a simple 'engine hook' as disclosed in U.S. Pat. No. 5,267,885 or a very similar 'motor hook' as disclosed in U.S. Pat. No. 5,212,946. The engine hook is a long strip of metal which is bent at both ends and is placed, bend side inward, against the motor tube. The forward bend secures the hook to the model rocket frame. The aft end is pulled back by the consumer to permit motor insertion into the motor tube then springs towards the motor to provide motor retention. These methods are inexpensive and viable retention for smaller model rocket kits, but are not adequate for high impulse motors and for do-it-yourself model rocket projects. Additionally, motor sizes are limited because the forward end of the engine hook typically protrudes into the motor tube thus prohibiting the use of motors longer than the hook.

Other techniques of motor retention, know to those in the art, include motor tube mounts, tape friction-fit and motor-clamp. These methods and disadvantages are described below.

Motor-tube mounts, such as those made by Aero Pack International (Miramar, Calif.), comprise of a threaded annular ring glued to the outside of the motor-mount tube and a mating retaining cap which screws onto the annular ring securing the motor. This technique is very costly and requires purchasing a system for each model rocket built. It also adds a great deal more mass to the rocket than the present invention, making the rocket less stable and impeding altitude performance.

Tape friction-fit is a method by which masking tape is added to the outer layer of the model rocket motor and forced into the motor mount tube until friction disallows further insertion. This method has the disadvantage that is not highly reliable, particularly to high power motors, and a slight misjudgment or misapplication can cause failure and destruction.

Motor-clamps, such as those made by Giant Leap Rocketry (Baton Rouge, La.) feature clamps which fit over the lip of a re-loadable motor and are attached to the rocket frame via a single screw and T-nut. The disadvantages are, first, it is not reliable when using a motor with no inner lip, such as a single-use motor. Secondly, the long leverage of the clamp and the pivot point about the single screw head could fail under significant vibration and ejection charge impulse.

Object and Advantages

Accordingly, several objects and advantages of the present invention are:

a) to provide a method of motor retention which uses a minimum of mass for optimum model rocket stability and performance, yet of sufficient strength;

b) to provide a method of motor retention which minimizes consumer error and system failure making for highly reliable motor retention;

c) to provide a method of motor retention which is economical and can be used on multiple rockets, repeatedly;

d) to provide a method of motor retention which is easily secured, removed and visually inspected;

e) to provide a method of motor retention which minimally effects the gas pressures about the re-loadable rocket motor nozzle to afford the consumer the motor manufacture's expected performance.

f) to provide a method of motor retention which does not limit the length of the rocket motor installed into the model rocket.

Further objects and advantages will become apparent from a consideration of the ensuing description and drawings.

DRAWING FIGURES

REFERENCE NUMERALS IN DRAWINGS

| | |
|---|---|
| 10 flange | 12 support |
| 14 mount | 16 longitudinal through-hole |
| 18 concavity | 20 rocket frame |
| 22 motor tube | 24 motor aft closure |
| 26 motor nozzle | 28 attachment screw |
| 30 motor cavity | |

SUMMARY

In accordance with the present invention a model rocket motor retainer comprises a flange having a concavity, several perpendicular supports adjacent the flange and two mounts parallel to the flange having through holes.

Figure 1:
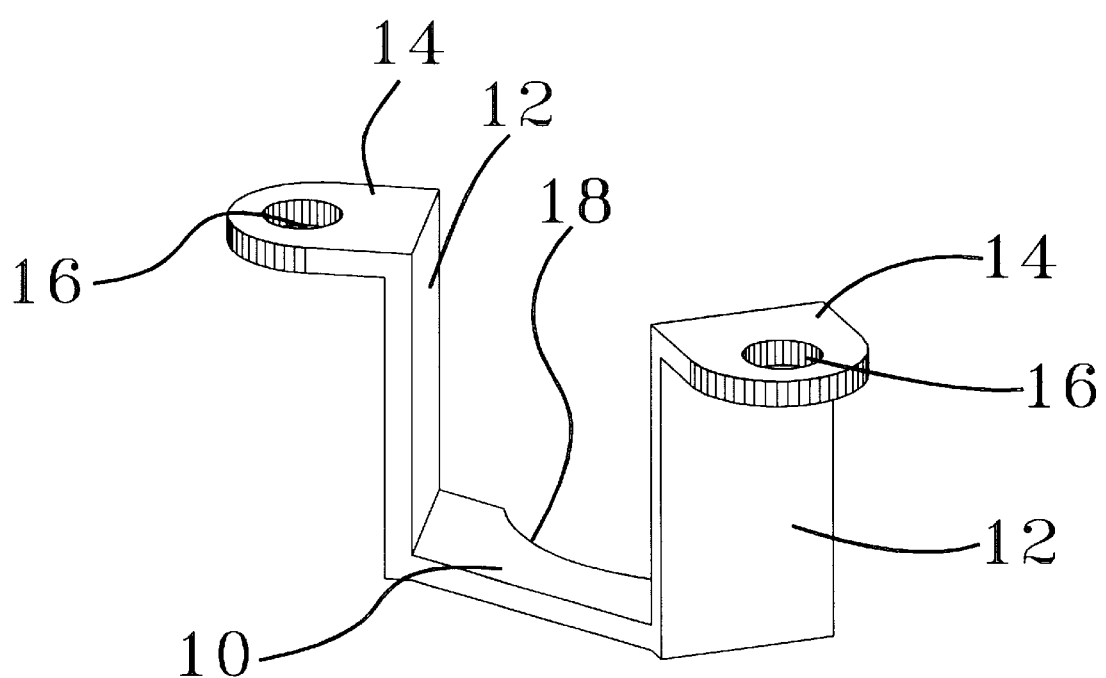
FIG. 1 shows the isometric aspect of a motor retainer.
Figure 2:
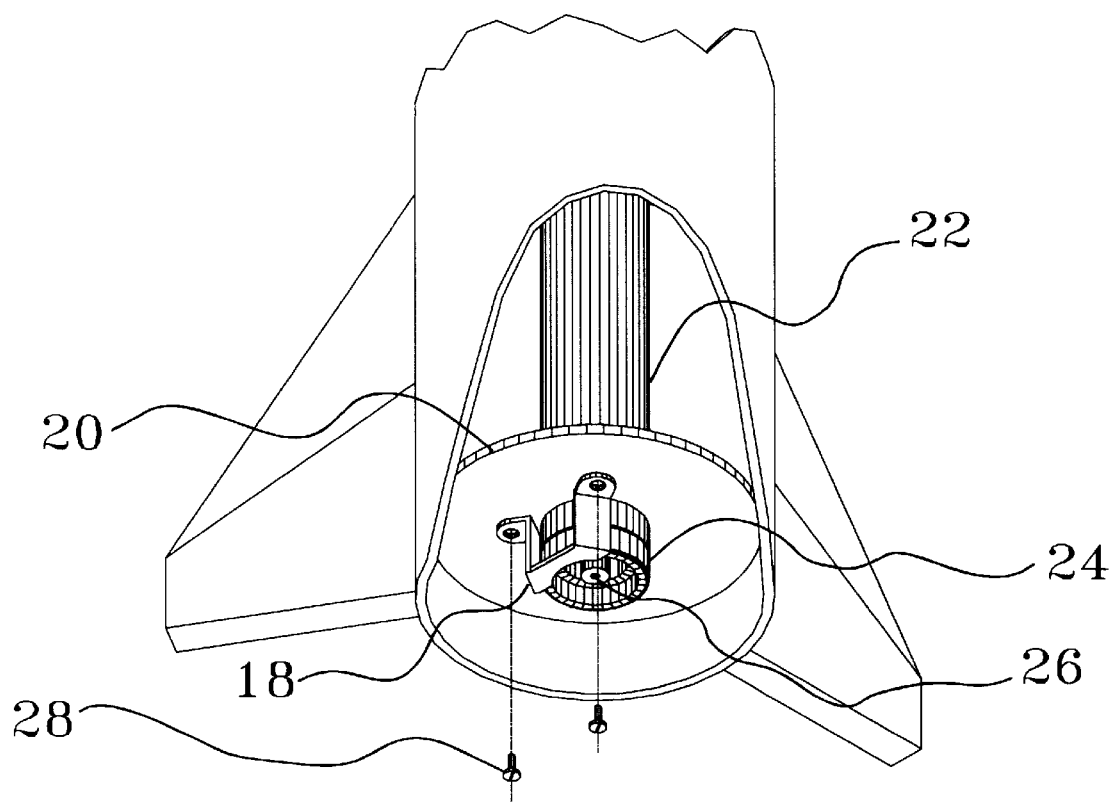
FIG. 2 shows a operational demonstration of a motor retainer in a typical application.

Description—FIGS. 1 and 2

A typical view of the model rocket motor retainer is illustrated in FIG. 1 (isometric view). The retainer has a flange 10 with a concavity 18.

Either side of the flange angles to form two supports 12 extending to a length equal to or greater than the length of the motor aft closure 24 along side the motor tube 22.

At each end of the supports 12, are the mounts 14 which are parallel to the flange and each containing a longitudinal through-hole 16.

Operation—FIG. 2

Once the motor has been telescopically inserted into the motor tube 22 such that the motor aft closure 24 abuts the aft end of the motor tube 22. Then the motor retainer is aligned over the aft end of the motor such that the flange covers an adequate portion of the motor aft closure and the mounts abut the rocket frame 20. If used in conjunction with a re-loadable motor casing, the concavity 18 aligns with a annular ring of the casing so as to minimally affect the cavity about the motor nozzle 26.

The mounts 14 which are now aligned adjacent to the rocket frame 20 afford a means for attachment of the motor retainer to the rocket frame 20 with the use of the longitudinal through-holes 16. Typically the means of attachment will be with the use of common hardware such as T-nuts (previously attached to the rocket frame) and screws 28.

CONCLUSIONS, RAMIFICATIONS, and SCOPE

Thus the reader will see that the rocket motor retainer of the present invention provides a highly reliable, economical, lightweight yet easy to design-in and operate device which can be used repeatedly on many rocket kits by a model rocketeer.

While the above description contains many specificities, these should not be construed as limitations on the scope of the invention, but rather as an exemplification of one preferred embodiment thereof Many other variations are possible. For example, the described components of the invention can be made integrally or separately; can be made smaller or larger; or can have various design accommodations made on the mount for other methods of attachment to the rocket frame.

Accordingly, the scope of the invention should be determined not by the embodiment(s) illustrated, but by the appended claims and their legal equivalents.

What I claim as being new and desired to be protected by Letter Patent of the United States is as follows:

1. A retainer as a means for containing a model rocket motor within a rocket frame, comprising:

a) a flange of rigid material having sufficient area to extend across a chord the motor aft end, b) within said flange a concavity of a predetermined radius to be centrally located, c) a plurality of perpendicular supports contiguous with the said flange of a length at least the height of the motor aft closure, d) for a each said support a mount with a longitudinal though-hole as a means for securing the retainer to the rocket frame, whereby said retainer will hold securely a rocket motor into the rocket frame.

* * * * *